(12) United States Patent
Cho et al.

(10) Patent No.: US 9,372,100 B2
(45) Date of Patent: Jun. 21, 2016

(54) DIGITAL OPTO-ELECTRIC PULSE APPLICATION METHOD FOR CORRECTING BIT ERROR OF VERNIER-TYPE OPTICAL ENCODER

(71) Applicants: SNU R&DB FOUNDATION, Seoul (KR); RS AUTOMATION CO., LTD., Pyeongtaek-si, Gyeonggi-do (KR)

(72) Inventors: Dong Il Cho, Seoul (KR); Wook Bahn, Seoul (KR); Tae Il Kim, Seoul (KR); Sang Hoon Lee, Seongnam-si (KR)

(73) Assignees: SNU R&D Foundation, Seoul (KR); RS Automation Co., Ltd., Pyeongtaek-si, Gyeonggi-Do (KR)

( * ) Notice: Subject to any disclaimer, the term of this patent is extended or adjusted under 35 U.S.C. 154(b) by 67 days.

(21) Appl. No.: 14/401,808

(22) PCT Filed: Apr. 25, 2013

(86) PCT No.: PCT/KR2013/003552
§ 371 (c)(1),
(2) Date: Nov. 17, 2014

(87) PCT Pub. No.: WO2013/172564
PCT Pub. Date: Nov. 21, 2013

(65) Prior Publication Data
US 2015/0171999 A1    Jun. 18, 2015

(30) Foreign Application Priority Data

May 18, 2012   (KR) .................. 10-2012-0052874
Mar. 19, 2013  (KR) .................. 10-2013-0029118

(51) Int. Cl.
*H03M 13/00* (2006.01)
*G06F 11/00* (2006.01)
(Continued)

(52) U.S. Cl.
CPC .......... *G01D 5/3473* (2013.01); *G01D 5/24471* (2013.01); *G01D 5/34792* (2013.01); *G01D 5/36* (2013.01)

(58) Field of Classification Search
CPC .............. G01D 5/3473; G01D 5/2454; G01D 5/24471; G01D 5/36; G01D 5/34792
See application file for complete search history.

(56) References Cited

U.S. PATENT DOCUMENTS

| 4,602,242 A | 7/1986 | Kimura |
| 6,820,030 B2 * | 11/2004 | Steinlechner ........ G01D 5/2451 702/151 |

(Continued)

FOREIGN PATENT DOCUMENTS

| EP | 0072549 A2 | 2/1983 |
| JP | 08-219810 A | 8/1996 |

OTHER PUBLICATIONS

Wekhande et al., High resolution absolute position Vernier shaft encoder suitable for high-performance Pmsm servo drives, Feb. 2006, IEEE Transaction on Instrumentation and measurement, vol. 55, No. 1, pp. 357 to 364.*

(Continued)

*Primary Examiner* — Shelly A Chase
(74) *Attorney, Agent, or Firm* — Fenwick & West LLP

(57) ABSTRACT

This disclosure relates to a method for detecting an absolute rotation angle of an optical rotary encoder, and more particularly, to an optical encoder having a signal track for generating a digital pulse which may correct an error when a high-level bit is generated in a Vernier type. The optical encoder according to an embodiment of the present disclosure includes a master track for generating a sinusoidal signal with the fastest cycle, a Vernier track for generating a sinusoidal signal with a cycle smaller than that of the master track by a predetermined value, and a digital track for generating a digital pulse signal with a cycle proportional to the cycle of the sinusoidal signal of the master track.

6 Claims, 5 Drawing Sheets

(51) Int. Cl.
*G01D 5/347* (2006.01)
*G01D 5/36* (2006.01)
*G01D 5/244* (2006.01)

(56) References Cited

U.S. PATENT DOCUMENTS 7,026,604 B2 4/2006 Keong
7,266,567 B2 9/2007 Inenaga et al.
2011/0155895 A1 6/2011 Nagura

OTHER PUBLICATIONS

Kojima et al., Study on high accuracy optical Encoder with 30 bits, 2004, IEEE, pp. 493 to 498.*
Urda et al., Optical absolute encoder using spatial filter, 1987, SPIE vol. 814, pp. 217 to 220 (retreived from google.com Mar. 14, 2016).*
PCT International Search Report and Written Opinion, PCT/KR2013/003552, Aug. 12, 2013, 6 pages.

* cited by examiner

DIGITAL OPTO-ELECTRIC PULSE APPLICATION METHOD FOR CORRECTING BIT ERROR OF VERNIER-TYPE OPTICAL ENCODER

TECHNICAL FIELD

This disclosure relates to a method for detecting an absolute rotation angle of an optical rotary encoder, and more particularly, to an optical encoder having a signal track for generating a digital pulse which may correct an error when a high-level bit is generated in a Vernier type. Since the height of the signal track described above may be lowered in comparison to an analog signal track of a general Vernier-type optical encoder, the encoder may have a smaller design.

In addition, since it is possible to improve tolerance against noise generated at a high-level bit when an angle of the encoder is measured by using a signal generated at the track, a reliable encoder may be provided.

BACKGROUND ART

In order to measure and control a rotation angle of a motor, an encoder for sensing a rotation angle is attached to a rotary shaft of the motor and measures an absolute angle by using gray codes, binary codes, M codes, pseudorandom codes, Vernier-type codes or the like.

Among them, the Vernier-type encoder figures out an absolute angle by using phase difference information of signals with different cycles. Theoretically, this method is composed of only two tracks which generate two sinusoidal signals. However, practically, this encoder is composed of three or more tracks by adding a track for preventing a high-level bit error.

FIG. 1 shows a code disk of a general 3-track Vernier-type optical rotary encoder.

In FIG. 1, three analog tracks, 50, 52, and 54, may be classified into a master track 50, a Vernier track 52, and a segment track 54. The master track 50 generates a sinusoidal signal with the fastest cycle while the Vernier track 52 and the segment track 54 create sinusoidal signals with cycles smaller than the cycle of the master track 50 by predetermined values.

The maximum resolution available in the Vernier-type encoder is determined by:

1. A resolution of each sinusoidal signal when digitally converted.
2. A phase difference level of each sinusoidal signal.

Let's demystify how the Vernier-type encoder works. The Vernier-type encoder basically comprises two tracks: master and Vernier tracks. The master track generates sinusoidal signals with a cycle corresponding to the resolution of upper bit. This upper bit is produced when the encoder makes one rotation. On the other hand, the Vernier track generates sinusoidal signals with a cycle smaller than that of the master track by one. Hence, an upper bit signal is calculated from the phase difference of both track signals. When the encoder makes one rotation, the phase difference of both tracks linearly changes from 0 pi to 2 pi with respect to the rotation angle. For this reason, once the phase difference is measured and digitalized, a high-level bit signal is generated. In addition, while the high-level bit signal changes as much as 1 least significant bit (LSB), the sinusoidal signal of the master track changes from 0 pi to 2 pi. If the signal is digitalized, a low-level bit signal corresponding to the high-level 1 LSB may be generated.

The high-level bit signal may have higher change of causing a bit error due to noise, different from other track absolute position generating methods using gray codes, binary codes or the like. Therefore, a segment track for generating a sinusoidal signal with a cycle smaller than that of the master track by M ($M=2^N$, N is an integer greater than 1 and smaller than the bit number of the low-level bit signal) is added to correct the high-level bit signal.

The present disclosure proposes a method of adding an auxiliary digital track for generating a digital pulse signal corresponding to the master track, instead of adding a segment track for generating analog sinusoidal signal, in order to correct the high-level bit error. Since the signal track for generating a sinusoidal signal is sensitive to noise, the height of a track should be increased in order to ensure a signal level over a certain value. However, the signal track for generating a digital pulse signal is strong against noise at a relatively low height. Here, decreasing the height of a track means decreasing a length of a track pattern along the central direction of the disk. Since the analog track is substituted for the digital track, the entire size of the encoder disk is decreased.

DISCLOSURE OF INVENTION

Technical Problem

This disclosure is directed to correcting a high-level bit error by removing a segment track from a code disk pattern and a light receiving unit pattern of a 3-track Vernier-type high-resolution optical encoder and adding a track for generating a digital pulse signal with a low height. Here, the low height of the track means that the length of the track pattern along the central direction of the disk is short. If the track for generating a digital pulse signal is applied, high-level bit noise tolerance may be ensured while decreasing a width of the code disk. Therefore, the Vernier-type absolute position encoder may have a small design.

Solution to Problem

In one aspect, there is provided a method for arranging tracks for generating digital pulse signals, in which slits are disposed in a code disk to have a cycle proportional to the cycle of a signal of the master track, and a light receiving device having a light receiving unit array for detecting light of the light emitting unit, passing through the code disk arranged as above, is provided.

In order to correct 2 bit error or more of the high-level bit information obtained in the Vernier type, tracks for generating digital pulse signals having cycles $2^n$ times (n is a natural number) of the cycle of the basic digital pulse signal track may be added. In addition, in order to accurately measure a region in which a level of digital opto-electrical pulse (DOP) signal changes, an additional DOP signal having a phase difference of 180 degrees may be generated and both signals may be compared to generate a new DOP signal.

Advantageous Effects of Invention

If the digital pulse signal according to the embodiment of the present disclosure is used, high-level bit noise tolerance of a Vernier-type encoder having two tracks may be reinforced. Therefore, the Vernier-type absolute position encoder may have a small design.

BEST MODE FOR CARRYING OUT THE INVENTION

Figure 1:
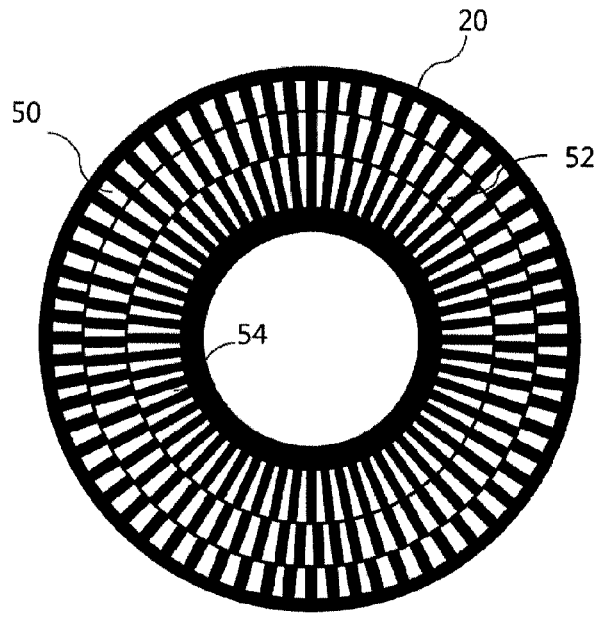
FIG. 1 shows a code disk of a general 3-track Vernier-type optical rotary encoder.

Hereinafter, a Vernier-type encoder for detecting a rotation angle of an absolute position using a digital opto-electrical pulse (DOP) will be described in detail with reference to the accompanying drawings. However, in the description of embodiments, if it is judged that detailed explanation about known functions or configurations in relation to the present disclosure or other matters may make the substance of the present disclosure unnecessarily vague, such detailed explanation will be omitted. In addition, in the drawings, the size of each component may be exaggerated, without being limited to an actual size.

Figure 2:
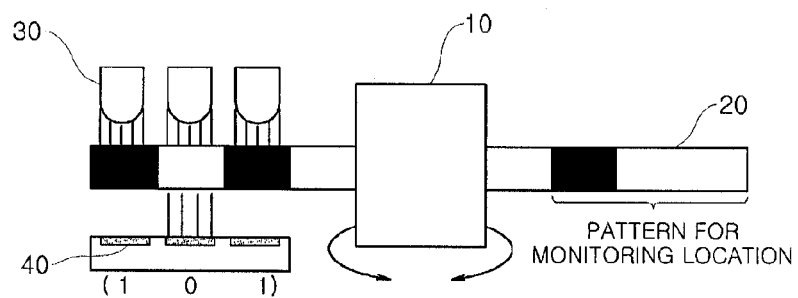
FIG. 2 shows an optical rotary encoder according to an embodiment of the present disclosure.

FIG. 2 shows an optical rotary encoder according to an embodiment of the present disclosure.

In FIG. 2, if a code disk 20 rotates based on a motor rotary shaft 10, light output from a light emitting unit 30 passes through pattern tracks of the code disk 20 and is input to a light receiving unit 40. The light receiving unit 40 converts the light, received through each track, into an electric signal.

Figure 3A:
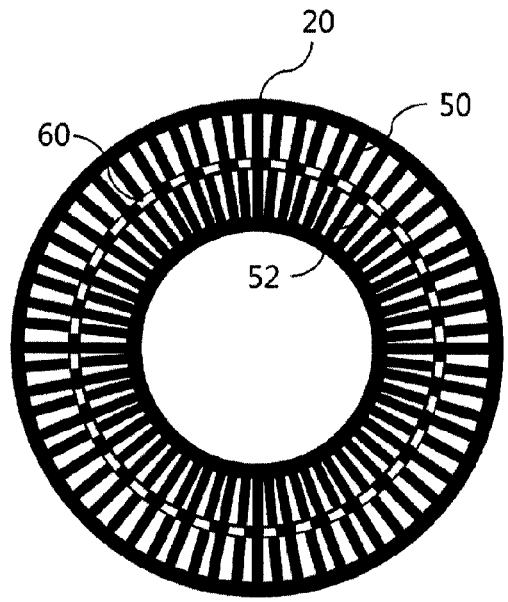
FIGS. 3a and 3b show a code disk of the optical rotary encoder according to an embodiment of the present disclosure.
Figure 3B:
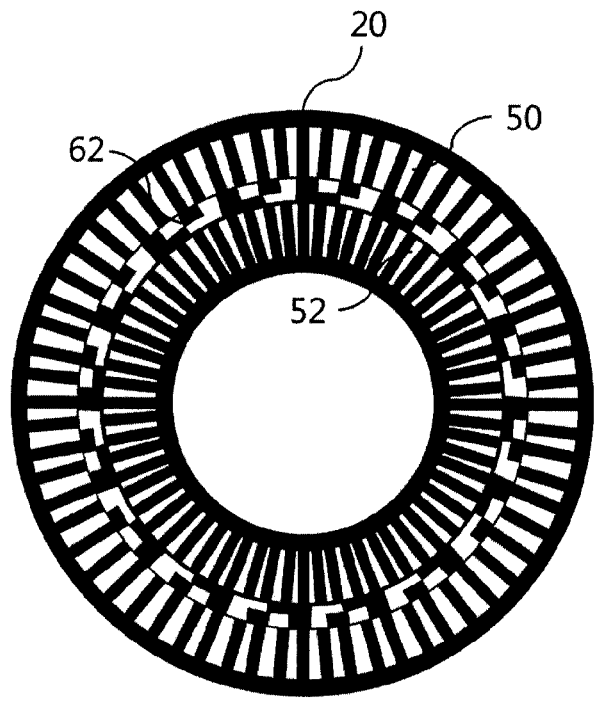

FIGS. 3a and 3b shows the code disk 20 according to an embodiment of the present disclosure. FIG. 3a presents an example of a code disk having a single digital track 60 while FIG. 3b describes an example of a code disk having two digital tracks 62.

In FIGS. 3a and 3b, the segment track 54 of the code disk of the 3-track Vernier-type optical rotary encoder, depicted in FIG. 1, is excluded, and the digital track 60 or 62 is added. Two analog tracks 50, 52 of FIGS. 3a and 3b may be classified into a master track 50 and a Vernier track 52. The master track 50 generates a sinusoidal signal with the fastest cycle, and the Vernier track 52 generates a sinusoidal signal with a cycle smaller than that of the master track 50 by a predetermined value. The added digital track may include one or more tracks. The digital track 60 or 62 added in FIGS. 3a and 3b has a smaller height than the analog tracks 50, 52.

Figure 4A:
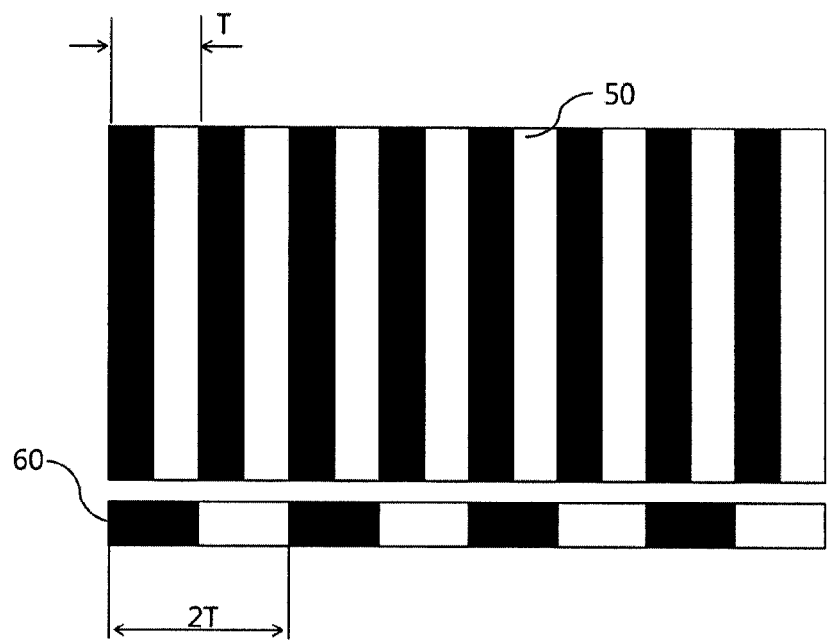
FIGS. 4a and 4b show a code disk slit pattern for generating a digital opto-electrical pulse (DOP) according to an embodiment of the present disclosure.
Figure 4B:
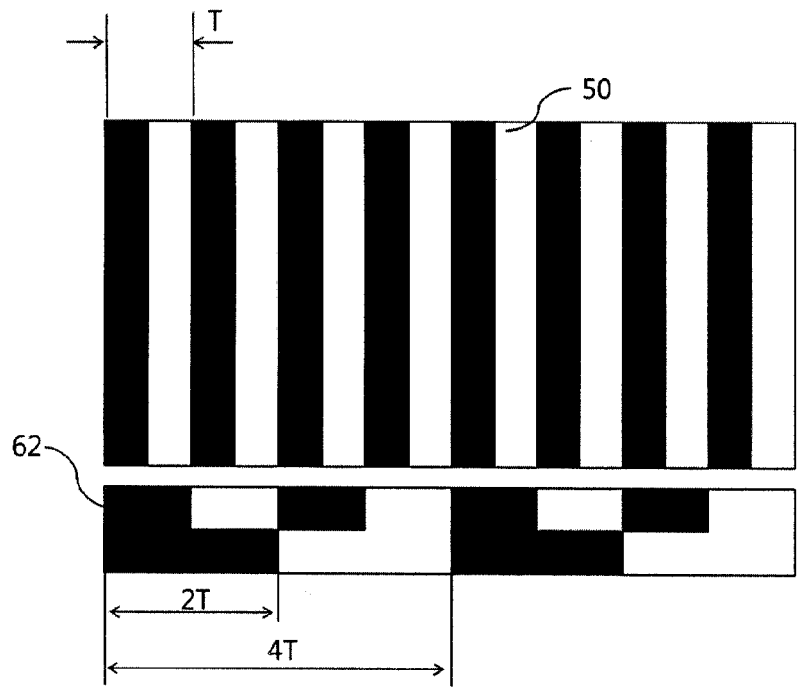

FIGS. 4a and 4b are diagrams for illustrating a detailed method for configuring a digital pattern for generating a digital opto-electrical pulse (DOP) in the code disk pattern depicted in FIGS. 3a and 3b. FIG. 4a shows an example of a code disk pattern having a single digital track, and FIG. 4b shows an example of a code disk pattern having two digital tracks.

The slit pattern 60 or 62 for generating a DOP signal on the code disk 20 is configured to have a width proportional to the width of the slit pattern of the master track 50. FIGS. 4a and 4b show, for illustration, a single digital track slit having a width two times of the width of the slit pattern of the master track, and two digital track slits respectively having widths two times and four times of the width of the slit pattern of the master track. The slit pattern is disposed along the circumference of the code disk 20. In the diagrams above, the circular arrangement is depicted as a linear arrangement for convenience.

Figure 5:
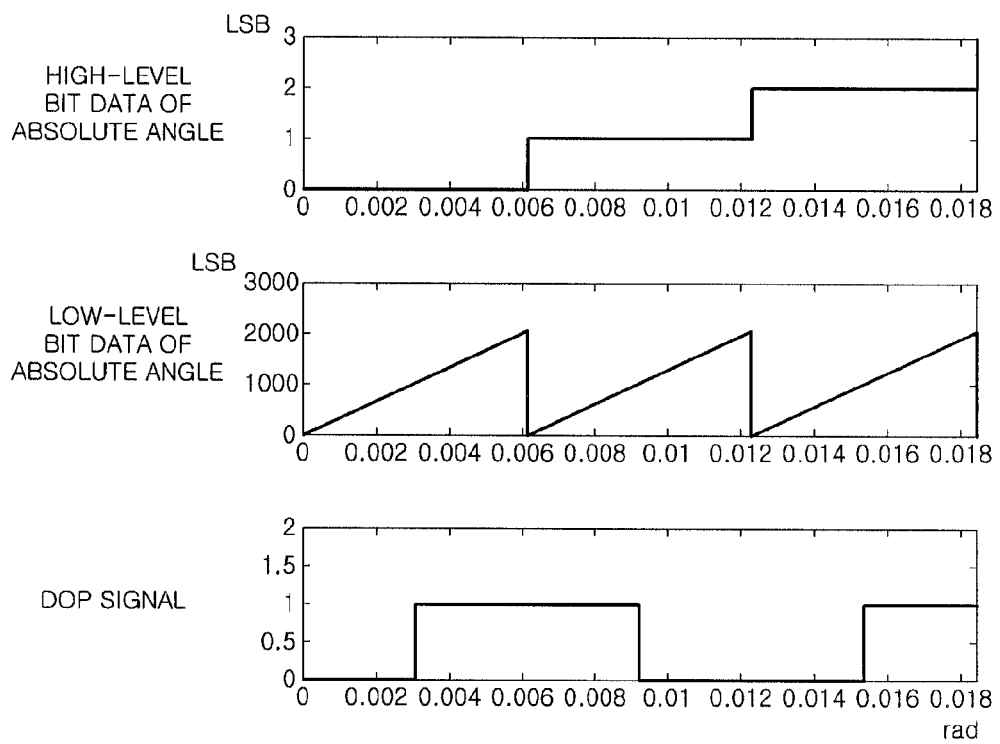
FIG. 5 show a relation between an absolute angle and a digital pulse signal obtained according to an embodiment of the present disclosure.

FIG. 5 shows examples of a high-level bit signal generated using a phase difference between sinusoidal signals obtained in the master track and the Vernier track in the Vernier-type absolute angle generating method, a low-level bit signal generated using a phase change of the sinusoidal signal obtained in the master track, and a digital pulse signal for correcting an error of the high-level bit signal. In the figure, for illustration, a case of using a 1 bit DOP signal with a slit having a width two times of the width of the slit pattern of the master track is depicted.

In three graphs of FIG. 5, respectively, the x axis represents a rotation angle of the disk, with a unit of radian. In addition, in the first and second graphs, the y axis represents LSB, and the y axis of the third graph represents a digital value of the DOP signal, which is 0 or 1, with no unit.

In FIG. 5, among all absolute angle data, the high-level bit data has a 10 bit signal in total, and the low-level bit data has a 11 bit signal in total, which represents that the low-level bit data changes from 0 to 2047 while the high-level bit data changes by 1 bit. In addition, this figure assumes the case in which 1 bit error occurs in the high-level bit signal to the maximum, in which 1 bit DOP signal is used.

Figure 6:
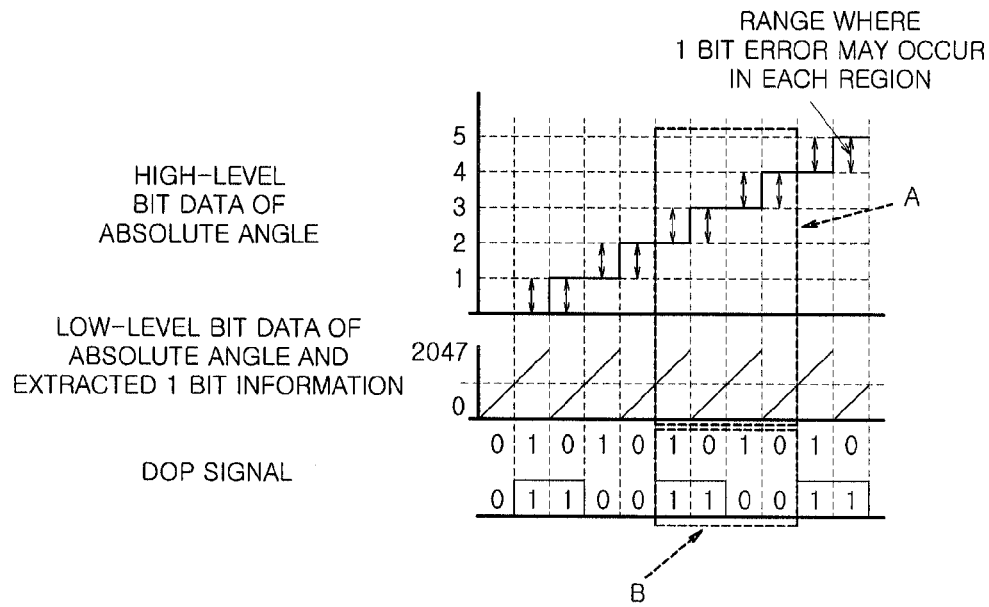
FIG. 6 illustrates 1-bit error correction of high-level bit data by generating a digital pulse signal having a cycle two times of the cycle of a sinusoidal signal of a master track.

FIG. 6 is a diagram for illustrating 1 bit error correction of high-level bit data by generating a digital pulse signal having a cycle two times of the cycle of a sinusoidal signal of a master track.

The 1 bit error of the high-level bit data is assumed in FIG. 6 so that, based on the line along which the high-level bit data actually changes in the graph of the high-level bit data of the absolute angle, a left half region may be generated as +1 and a right half region may be generated as −1.

In FIG. 6, an operating unit (not shown) generates Vernier-type high-level bit absolute angle information by using a phase difference between the sinusoidal signals of the master track 50 and the Vernier track 52. Subsequently, the operating unit receives values of the high-level bit data, the low-level bit data and the digital pulse signal, converted by using the signals of the master track 50 and the Vernier track 52, and corrects 1 bit error of the high-level bit data into a digital pulse signal.

In detail, in the case the high-level bit is measured as 3, the A portion of FIG. 6 shows four regions which may be measured as 3 if the 1 bit error is assumed as above.

In the second and third graphs of FIG. 6, the low-level bit signal repeats values of 0 1, and the DOP signal repeats values of 0 1 1 0, which means that the cycle of the DOP signal is two times of the cycle of the low-level bit signal.

In the B portion of FIG. 6, when the absolute angle high-level bit data is measured as 3, if the 1 bit signal extracted from the single DOP signal and the low-level bit data is checked, it is determined as one of four combinations (1 1), (0 1), (1 0), (0 0). Therefore, if the measurement value of the high-level bit data does not satisfy any of the four combinations, the measurement value of the high-level bit data may be checked as an error and then corrected.

Figure 7:
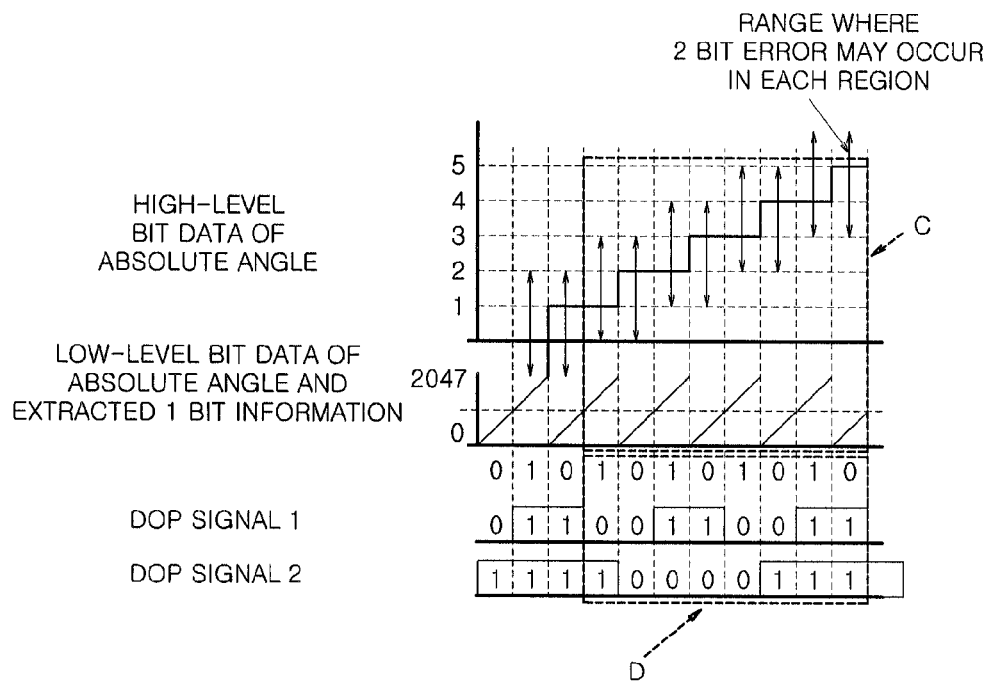
FIG. 7 illustrates 2-bit error correction of high-level bit data by additionally generating a digital pulse signal having a cycle four times of the cycle of the sinusoidal signal of the master track.

FIG. 7 is a diagram for illustrating 2 bit error correction of high-level bit data by generating a digital pulse signal having a cycle four times of the cycle of the sinusoidal signal of the master track.

The 2 bit error of the high-level bit data is assumed in FIG. 7 so that, based on the line along which the high-level bit data actually changes in the graph of the high-level bit data of the absolute angle, a left half region may be generated as (one of −1, +1, +2) and a right half region may be generated as (one of −2, −1, +1).

In the case the high-level bit is measured as 3, the C portion of FIG. 7 represents 8 regions which may be measured as 3, if the 2 bit error is assumed as above.

In the second, third and fourth graphs of FIG. 7, the low-level bit signal repeats values of 0 1, the DOP signal 1 repeats values of 0 1 1 0, and the DOP signal 2 repeats values of 1 1 1 1 0 0 0 0, which means that the cycle of the DOP signal is four times of the cycle of the low-level bit signal.

In the D portion of FIG. 7, when the absolute angle high-level bit data is measured as 3, if the 1 bit signal extracted from the two DOP signals and the low-level bit data is checked, it is determined as one of eight combinations (1 0 1), (0 0 0), (1 1 0), (0 1 0), (1 0 0), (0 0 1), (1 1 1), (0 1 1). Therefore, if the measurement value of the high-level bit data does not satisfy any of the eight combinations, the measurement value of the high-level bit data may be checked as an error and then corrected.

In FIGS. 6 and 7, a method for correcting an error of the high-level bit data by generating digital pulse signals respectively having cycles two times and four times of the cycle of the sinusoidal signal of the master track has been described. If this method is expanded and generalized, n bit error of the high-level bit data may be corrected into digital pulse signals by generating digital pulse signals, obtained by multiplying the cycle of the digital pulse signal, which is two times of the cycle of the sinusoidal signal of the master track, by 1 to $2^{n-1}$, in the optical encoder of the present disclosure.

Figure 8:
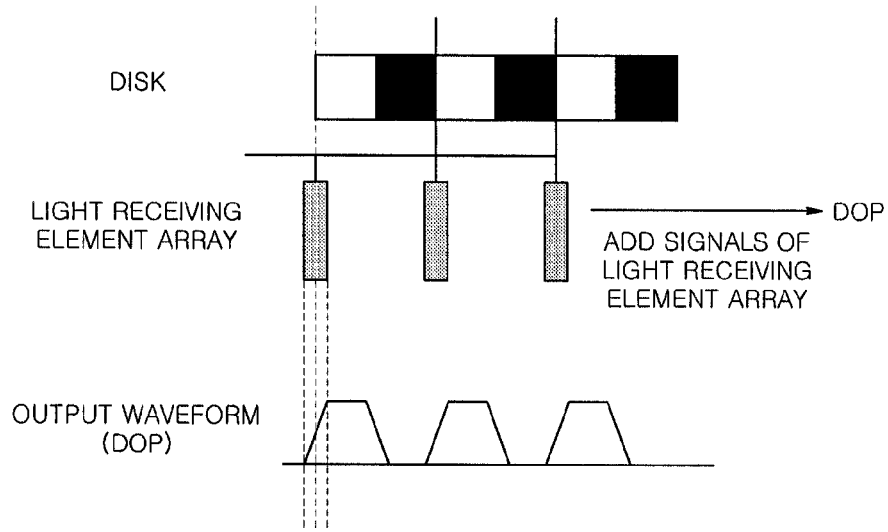
FIG. 8 shows a code disk slit according to an embodiment of the present disclosure, and a light receiving element array and an output waveform of a DOP signal corresponding thereto.
Figure 9:
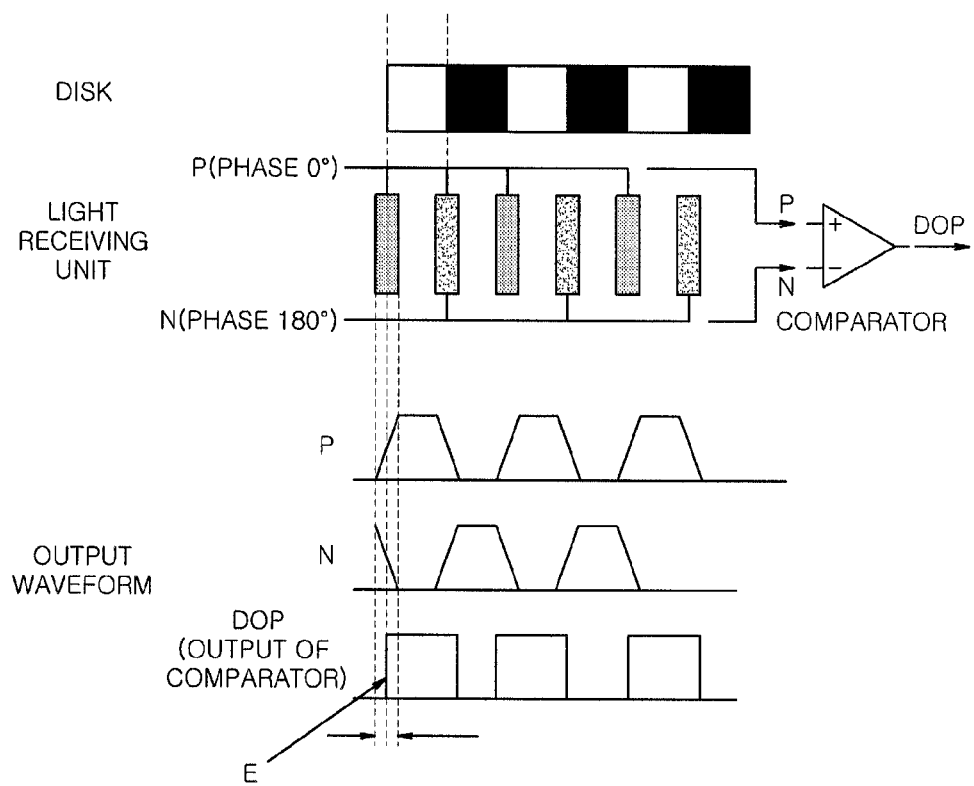
FIG. 9 shows a code disk slit for generating an additional DOP with a phase difference of 180 degrees, and a light receiving element array and an output waveform of a DOP signal corresponding thereto.

FIG. 8 is a diagram showing a code disk slit according to an embodiment of the present disclosure, and a light receiving element array and an output waveform of a DOP signal corresponding thereto, and FIG. 9 is a diagram showing a code disk slit for generating an additional DOP with a phase difference of 180 degrees, and a light receiving element array and an output waveform of a DOP signal corresponding thereto.

First, referring to FIG. 8, since the light receiving unit for generating a DOP signal is substantially not ideal, a slope is present in a region where a level changes, different from the DOP signal of FIG. 5, and a digitalized value may be ambiguous in a certain region. In order to prevent this, an additional DOP with a phase difference of 180 degrees may be generated as shown in FIG. 9, and two DOP signals may be compared by means of a comparator to generate a new DOP signal with less ambiguity.

In detail, the comparator compares the digital pulse signal with an inverse digital pulse signal, and generates a new digital pulse signal in which slopes of a rising edge and a falling edge of the digital pulse signal are increased. Here, the slope means a slope in the E region, in which a transient state of the digital pulse signal becomes sharp.

The present disclosure has been described based on embodiments depicted in the drawings. However, they are just for illustrations, and it will be understood by those having ordinary skill in the art that various changes or modifications can be made therefrom. However, such changes or modifications should be regarded as falling into the range of the present disclosure. Therefore, the scope of the present disclosure should be defined based on the appended claims.

The invention claimed is:

1. A Vernier-type optical rotary encoder for generating rotation angle information of an absolute position, the optical encoder comprising:
   a master track for generating a sinusoidal signal with the fastest cycle;
   a Vernier track for generating a sinusoidal signal with a cycle smaller than that of the master track by a predetermined value; and
   a digital track for generating a digital pulse signal with a cycle proportional to the cycle of the sinusoidal signal of the master track.

2. The optical encoder according to claim 1,
   wherein Vernier-type high-level bit absolute angle information is generated by using a phase difference between the sinusoidal signals of the master track and the Vernier track, and
   wherein the optical encoder further comprises an operating unit for receiving high-level bit data, low-level bit data and digital pulse signal, converted by using the signals of the master track and the Vernier track, and correcting 1 bit error of the high-level bit data into the digital pulse signal.

3. The optical encoder according to claim 1,
   wherein digital pulse signals obtained by multiplying the digital pulse signal by 1 to $2^{n-1}$ are obtained to correct n bit error of the high-level bit data into the digital pulse signals.

4. The optical encoder according to claim 3,
   wherein when the digital pulse signal is generated, an inverse signal with a phase difference of 180 degrees from the digital pulse signal is additionally generated and compared with the digital pulse signal by using a comparator, and a new digital pulse signal in which slopes of a rising edge and a falling edge of the digital pulse signal are increased is generated.

5. The optical encoder according to claim 2,
   wherein digital pulse signals obtained by multiplying the digital pulse signal by 1 to $2^{n-1}$ are obtained to correct n bit error of the high-level bit data into the digital pulse signals.

6. The optical encoder according to claim 5,
   wherein when the digital pulse signal is generated, an inverse signal with a phase difference of 180 degrees from the digital pulse signal is additionally generated and compared with the digital pulse signal by using a comparator, and a new digital pulse signal in which slopes of a rising edge and a falling edge of the digital pulse signal are increased is generated.

* * * * *